United States Patent
Melo et al.

(10) Patent No.: US 10,097,718 B2
(45) Date of Patent: Oct. 9, 2018

(54) SYSTEM AND METHOD FOR TRACKING APPLICATION INFORMATION IN CUSTOMIZABLE MULTIFUNCTION PERIPHERALS

(71) Applicants: Kabushiki Kaisha Toshiba, Minato-ku (JP); Toshiba TEC Kabushiki Kaisha, Shinagawa-ku (JP)

(72) Inventors: Bill Melo, Laguna Hills, CA (US); Marianne Kodimer, Huntington Beach, CA (US); Young Park, Aliso Viejo, CA (US); William Su, Riverside, CA (US); Jia Zhang, Irvine, CA (US); Louis Ormond, Irvine, CA (US); Michael Yeung, Mission Viejo, CA (US)

(73) Assignees: Kabushiki Kaisha Toshiba, Minatu-ku (JP); Toshiba TEC Kabushiki Kaisha, Shinagawa-ku (JP)

( * ) Notice: Subject to any disclaimer, the term of this patent is extended or adjusted under 35 U.S.C. 154(b) by 0 days.

(21) Appl. No.: 15/455,785

(22) Filed: Mar. 10, 2017

(65) Prior Publication Data

US 2018/0013912 A1    Jan. 11, 2018

Related U.S. Application Data

(60) Provisional application No. 62/360,581, filed on Jul. 11, 2016.

(51) Int. Cl.
  *H04N 1/00* (2006.01)
  *H04N 1/327* (2006.01)
  *H04N 1/32* (2006.01)

(52) U.S. Cl.
  CPC ..... *H04N 1/00938* (2013.01); *H04N 1/00042* (2013.01); *H04N 1/00058* (2013.01);
  (Continued)

(58) Field of Classification Search
  CPC ........... H04N 1/00938; H04N 1/32539; H04N 1/32122; H04N 1/00042; H04N 1/00058;
  (Continued)

(56) References Cited

U.S. PATENT DOCUMENTS

| 8,947,696 B1 * | 2/2015 | Uyttendaele | G06F 3/1203 358/1.15 |
| 2009/0064055 A1 * | 3/2009 | Chaudhri | G06F 3/04817 715/863 |

(Continued)

*Primary Examiner* — Allen H Nguyen
(74) *Attorney, Agent, or Firm* — Ulmer & Berne LLP

(57) ABSTRACT

A system and method for application reporting by a multifunction peripheral includes a document processing device having an intelligent controller controlling operations of the multifunction peripheral, including operation of a scanner engine and a print engine. A memory stores a plurality of user selectable applications for the controller. The controller executes at least one user selectable application selected from a library of available applications. The processor determines when one or more of the user selectable applications are launched. The processor outputs status data relative to monitored application launches to an associated server via a network interface.

14 Claims, 9 Drawing Sheets

(52) U.S. Cl.
CPC ..... *H04N 1/00076* (2013.01); *H04N 1/00082* (2013.01); *H04N 1/00344* (2013.01); *H04N 1/32122* (2013.01); *H04N 1/32539* (2013.01); *H04N 1/32587* (2013.01); *H04N 1/32765* (2013.01); *H04N 2201/0094* (2013.01); *H04N 2201/3205* (2013.01); *H04N 2201/3214* (2013.01); *H04N 2201/3215* (2013.01); *H04N 2201/3276* (2013.01)

(58) Field of Classification Search
CPC ........... H04N 1/00076; H04N 1/00082; H04N 1/00344; H04N 1/32587; H04N 1/32765; H04N 2201/0094; H04N 2201/3205; H04N 2201/3276; H04N 2201/3214; H04N 2201/3215
USPC ....................................................... 358/1.15
See application file for complete search history.

(56) References Cited

U.S. PATENT DOCUMENTS

| | | | |
|---|---|---|---|
| 2010/0081375 A1* | 4/2010 | Rosenblatt | G08C 17/02 455/41.1 |
| 2012/0026081 A1* | 2/2012 | Kompalli | G06F 8/34 345/156 |
| 2013/0304861 A1* | 11/2013 | Gupta | H04L 67/10 709/217 |
| 2014/0355066 A1* | 12/2014 | Bergstrand | H04N 1/00244 358/1.15 |
| 2017/0310831 A1* | 10/2017 | Kodimer | H04N 1/00344 |

* cited by examiner

TopAccess e-Filing
Logout

| Device | Job Status | Logs | Registration | Counter | User Management | Administration |
| Setup | Security | Maintenance | Registration | AirPrint | Application | |

Application
Application List | Settings

Copy App  [Save] [Cancel]

☑ Automatically Send Application Diagnostic Data — 404
Allow the application to send diagnostic information to Toshiba Registration cloud server improves the quality of apps
The diagnostic data does not contain personally identifiable information Scan Quality ☐ Show options to the user        Page Scanning ☐ Show options to the user — 416
  ◉ 200 DPI
  ○ 300 DPI — 408                              ☐ Scan both sides of pages
  ○ 400 DPI                                        ☐ Remove Blank Pages Color Mode ☐ Show options to the user           Finishing ☐ Show options to the user
  ◉ Color                                          ☐ Staple
  ○ Gray Scale — 420                           ☐ Hole Punch
  ○ Black Only File Type ☐ Show options to the user            Scan Confirmation
  ◉ PDF                                            ☑ Print Confirmation Receipt — 424
  ○ TIFF — 412
  ○ JPG                                           Send Confirmation E-mail to
                                                   ☐ Logged in User
                                                   ☐ Other E-mail Addresses
                                                   [Enter up to 5 comma separated e-mail addresses]

| Install Software |                              | Top | Help |       ©2016 TOSHIBA TEC CORPORATION All Rights Reserved.

SYSTEM AND METHOD FOR TRACKING APPLICATION INFORMATION IN CUSTOMIZABLE MULTIFUNCTION PERIPHERALS

CROSS-REFERENCE TO RELATED APPLICATIONS

This application claims the benefit of U.S. Provisional Application No. 62/360,581, filed Jul. 11, 2016, which is incorporated herein by reference.

TECHNICAL FIELD

This application relates generally to multifunction peripherals. The application relates more particularly to monitoring of application usage on multifunction peripherals with user customizable applications for specific needs or constraints of different businesses.

BACKGROUND

Document processing devices include printers, copiers, scanners and e-mail gateways. More recently, devices employing two or more of these functions are found in office environments. These devices are referred to as multifunction peripherals (MFPs) or multifunction devices (MFDs). As used herein, MFP means any of the forgoing.

MFPs are typically provided with a fixed set of functions that are available to device end users. In addition to printing, copying, scanning and e-mailing, the device may add further options. Copying or printing may involve hole punching or stapling. Printing may be in black and white, or in color. Scanning may be to an image file or to a text-inclusive file via optical character recognition. These and other options, available from a fixed set of device functions and associated options, are typically selectable by device users via a user interface, such as a touchscreen display integrated into an MFP.

MFPs are complex devices that may require regular maintenance, some of which can be complex and outside of the capabilities of end users. Also, MFP devices can be expensive, providing a potential deterrent to purchases. More recently, companies lease office machines, such as MFPs, from third party providers. In certain scenarios, total cost of a device may be calculated by a negotiated, per-page charge. Monitoring of device usage may be made by looking at device counters, job logs or consumable levels. More recently, administration and monitoring of MFPs is being done by a networked computer designated as a monitor or data collector. Collection of device usage information or consumable usage information such as paper usage, toner or ink usage, is assigned to a dedicated administrative computer. Information collected by the administrative computer can be used to reorder supplies, schedule device maintenance and calculate usage charges to be assessed to a person or company.

SUMMARY

In accordance with an example embodiment of the subject application, a system and method for application reporting by a multifunction peripheral includes a document processing device having an intelligent controller controlling operations of the multifunction peripheral, including operation of a scanner engine and a print engine. A memory stores a plurality of user selectable applications for the controller. The controller executes at least one user selectable application selected from a library of available applications. The processor determines when one or more of the user selectable applications are launched. The processor outputs status data relative to monitored application launches to an associated server via a network interface.

BRIEF DESCRIPTION OF THE DRAWINGS

Various embodiments will become better understood with regard to the following description, appended claims and accompanying drawings wherein:

FIG. 4 is an example embodiment of a screenshot for administrative customization of applications;

DETAILED DESCRIPTION

Figure 1:
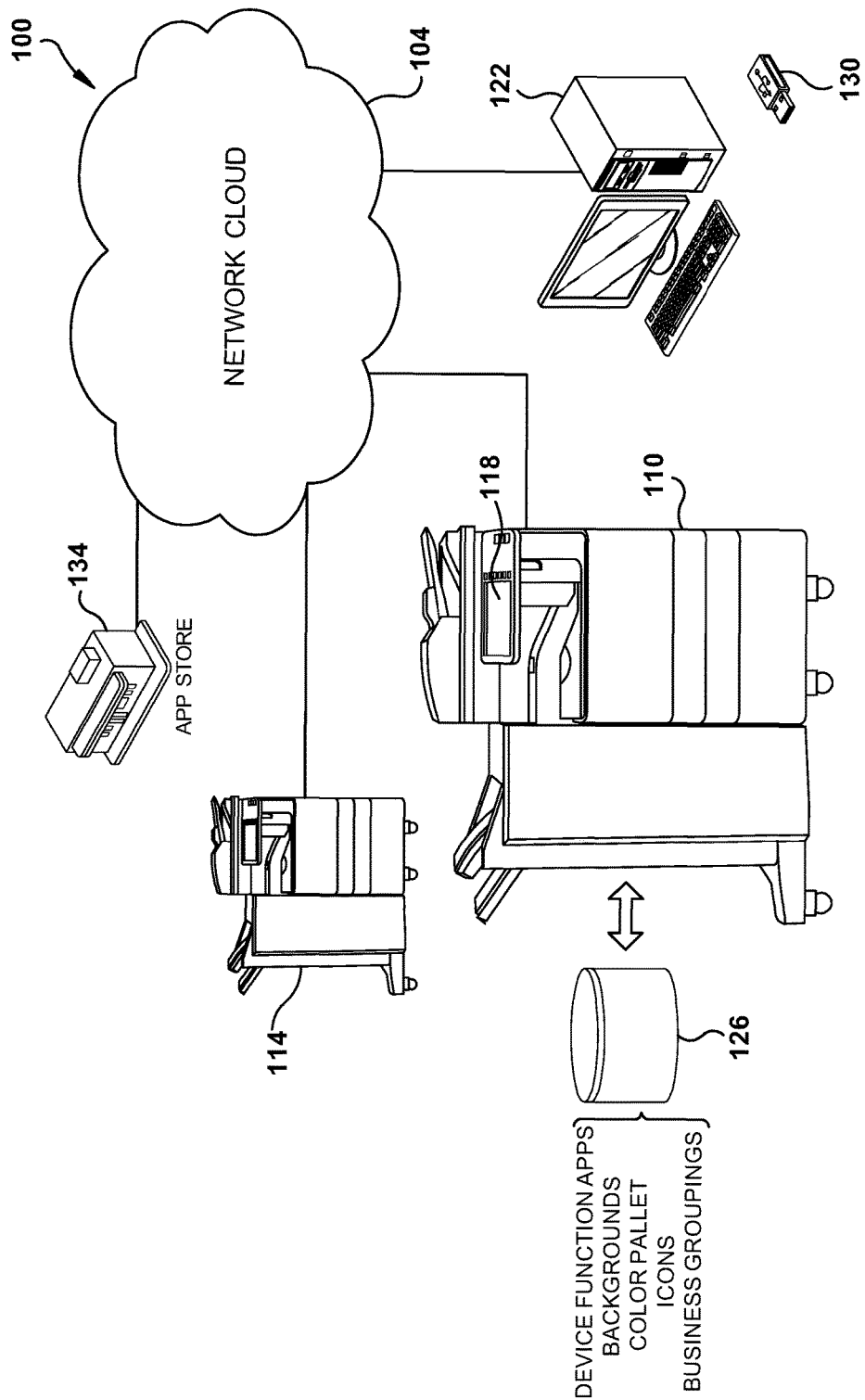
FIG. 1 an example embodiment of an MFP network.

The systems and methods disclosed herein are described in detail by way of examples and with reference to the figures. It will be appreciated that modifications to disclosed and described examples, arrangements, configurations, components, elements, apparatuses, devices methods, systems, etc. can suitably be made and may be desired for a specific application. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such.

MFPs are increasingly powerful and capable devices. With such increases comes increasing complexity of device-user interaction. There may be a substantial number of menus generated on the MFP display which may be hierarchical with many possible layers. Users must learn to navigate these menus and controls. A typical MFP user interface design will have most frequently used functions at a top, or high level menu. Less popular device functions can be difficult to find, as well as time consuming to locate. Some users are required to navigate complex menu structures to access less popular functions that they use frequently.

Certain businesses may have particular and frequent need for certain MFP functions which are not needed by other businesses. In these situations, device users may be frequently required to spend considerable time at an MFP user interface to complete their document processing tasks. In businesses with devices that differ from one another, there may be different steps that need to be taken with one device than those required to taken to complete the same job on another device available to them.

In addition to the forgoing, various businesses often have a set of forms that they use regularly. By way of example, an auto dealership may have forms for vehicle sale, vehicle lease, vehicle rental or vehicle purchase. They may also have forms for credit applications, license plate orders, insurance information, etc. An auto salesperson may have their own forms folder and grab a master of a needed form for photocopying for a customer. This requires additional steps for the salesperson. It also provides room for error or inconsistencies since one salesperson may have a different or outdated version of a form in their forms folder. Additionally, certain forms may need to be completed in duplicate, requiring two copies requiring the salesperson to recall that or make a trip back to the MFP. In addition, certain customer data may be sensitive, and even subject to privacy protection under the law, such as personal information that may appear in a credit application.

Other professions will have their own MFP device needs that are markedly different than those of other businesses. The legal profession, for example, may need forms for subpoenas, complaints, proof-of-service and invoices. The medical profession may need forms for patient consent, writing of prescriptions, patient information questionnaires or patient insurance information. The legal profession and the medical profession provide examples of businesses that need to maintain very high levels of confidentiality. Failure to do so may comprise a lawyer's attorney-client privilege. Failure to do so in the medical profession may result in a violation of confidentiality requirements of the U.S. Federal Health Information Portability and Accountability Act (HIPAA), leaving a potential for criminal or civil liability for breaches. Use of improper or outdated forms can result in losses in legal proceedings or patient harm in medical situations. Of course, these can also result in malpractice litigation.

Example embodiments herein provide a system and method for customization of MFPs by end users or system administrators. Functions specific to a particular business can customized to be more readily accessible on MFP interfaces which may be on a user interface of a device itself, communicated by a networked device via a web interface, or built in whole or in part within a driver, such as a printer driver, that is called on a user device. Certain functions may be made unavailable to device users, such as color printing or color copying to avoid toner or ink expenses. By way of further example, an administrator may also implement mandatory device functions, such as by automatically encrypting all e-mails. The administrator may also provide for a customized interface with the company color scheme and company logo. The administrator may also tailor menu hierarchy to have functions of specific or frequent needs placed in a more readily accessible location. As a further benefit, the MFP stores electronic documents, such as forms or templates, for uniform use by employees. In addition to the forgoing, the subject application includes example embodiments wherein a business obtains an MFP device with pre-stored libraries of forms, controls, menus or the like, which are generically in use by other businesses of the same type.

By way of example, the MFP suitably arrives to a business pre-populated with settings, menus, or electronic documents specific to different businesses. For example, there may be a default administrator setup choice for "Legal Profession," which includes legal forms, legal documents, brief templates and blank time slips. It may also include address information for various courts or governmental agencies. Thus, all or some of the law firm's needs may be setup immediately. The administrator may then add or replace electronic documents, such as by uploading or scanning from paper. They may also add needed device functions not appearing in the standard legal setup. They may also add or modify menu structures, as well as customize colors, fonts, resolution, etc. They may also import their firm logo so that it appears on the user interface. This is suitably done via a portable data device, such as USB drive, CD or DVD, via a network connection or by scanning a paper document bearing the logo. The administrator may also export and replicate this interface on other MFP devices in use by the business.

In accordance with the subject application, FIG. 1 illustrates an example embodiment of an MFP network 100 that includes one or more MFPs, illustrated by MFPs 110 and 114. Network 104 is suitably comprised of a local area network (LAN) or a wide area network (WAN) which may comprise the global Internet, or any suitable combination thereof. A system administrator or other user can access MFP control via any suitable user interface, such as an integrated user interface 118 or remotely, such as via workstation 122. While workstation 122 is illustrated as a wired computer, it will be appreciated that any suitable data device, including smartphones, tables, notebook computers, or the like, with network connections that are wireless or wired, may be used. Remote device interfacing is suitably done by accessing an MFP via a network address, such as an internet protocol or IP address. Access may be directly through a web interface, and may include tools such as TOPACCESS from Toshiba America Business Solutions, Inc.

MFP 110 is provided with data storage 126 for electronically storing data corresponding to available device function applications, display backgrounds, color pallets, icons, business groupings, etc.

Additional applications that are available to control MFPs may also be added. They may be physically transported to the MFP via a portable data device such as flash drive 130 or any other suitable data transfer mechanism including BLUETOOTH, near field communication (NFC), optical, CD, DVD, wireless or wired network, etc. Applications may also be purchased from an application store, such as App Store 134, suitably via network cloud 104.

Figure 2:
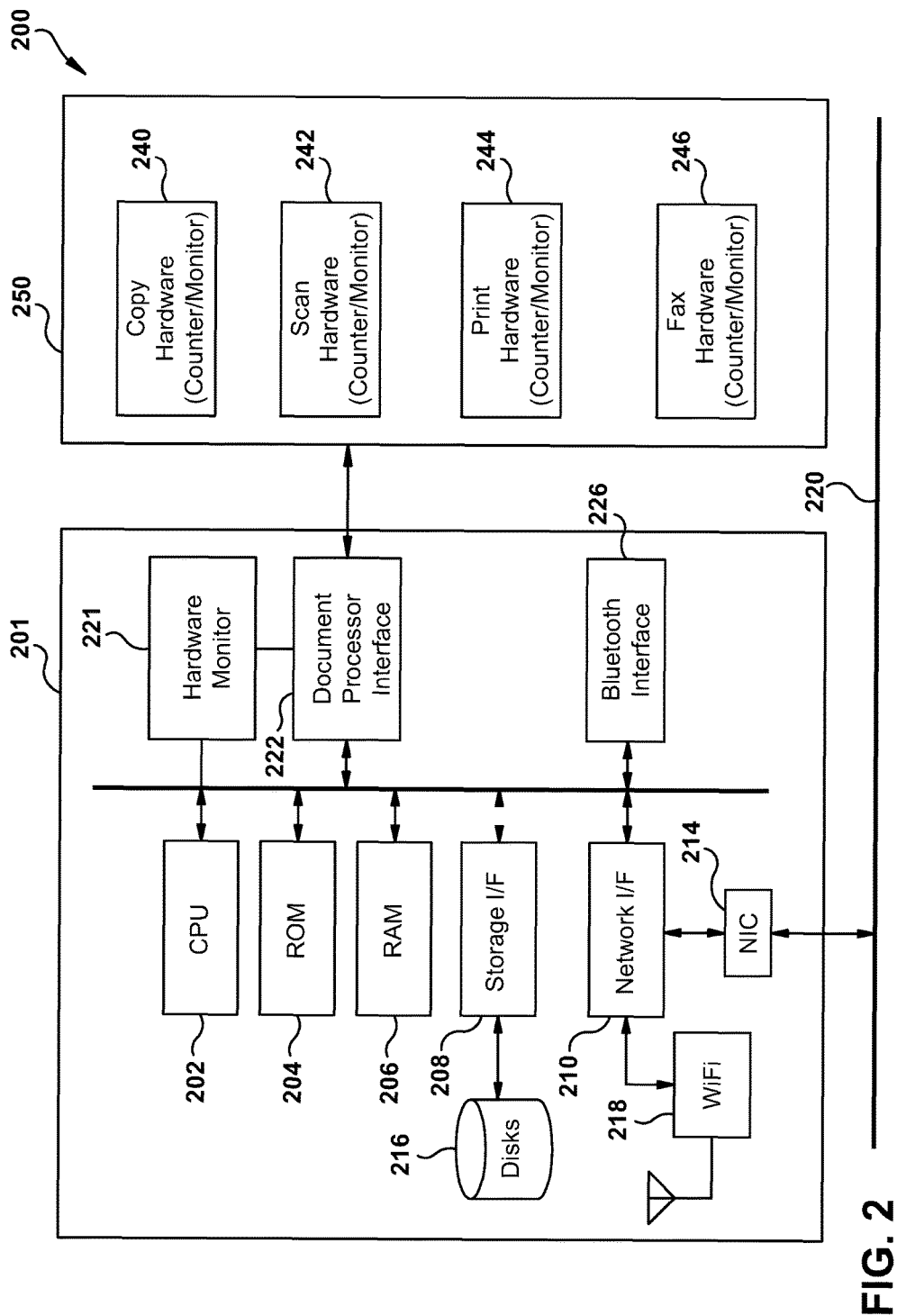
FIG. 2 is an example embodiment of a document rendering system.

Turning now to FIG. 2, illustrated is an example embodiment of a document rendering system 200 suitably comprised within an MFP, such as with MFPs 110 and 114 of FIG. 1. Included is controller 201 comprised of one or more processors, such as that illustrated by processor 202. Each processor is suitably associated with non-volatile memory such as ROM 204, and random access memory (RAM) 206, via a data bus 212.

Processor 202 is also in data communication with a storage interface 208 for reading or writing to a storage 216, suitably comprised of a hard disk, optical disk, solid-state disk, cloud-based storage, or any other suitable data storage as will be appreciated by one of ordinary skill in the art.

Processor 202 is also in data communication with a network interface 210 which provides an interface to a network interface controller (NIC) 214, which in turn provides a data path to any suitable wired or physical network connection 220, or to a wireless data connection via wireless network interface 218. Example wireless connections include cellular, Wi-Fi, BLUETOOTH 226, NFC, wireless universal serial bus (wireless USB), satellite, and the like. Example wired interfaces include Ethernet, USB, IEEE 1394 (FireWire), Apple Lightning, telephone line, or the like.

Processor 202 can also be in data communication with any suitable user input/output (I/O) interface which provides data communication with user peripherals, such as displays, keyboards, mice, track balls, touch screens, or the like. Hardware monitor 221 suitably provides device event data, working in concert with suitably monitoring systems. By way of further example, monitoring systems may include page counters, sensor output, such as consumable level sensors, temperature sensors, power quality sensors, device error sensors, door open sensors, and the like. Data is suitably stored in one or more device logs, such as in storage 216.

Also in data communication with data bus 212 is a document processor interface 222 suitable for data communication with MFP functional units 250. In the illustrated example, these units include copy hardware 240, scan hardware 242, print hardware 244 and fax hardware 246 which together comprise MFP functional hardware 250. It will be understood that functional units are suitably comprised of intelligent units, including any suitable hardware or software platform.

Figure 3:
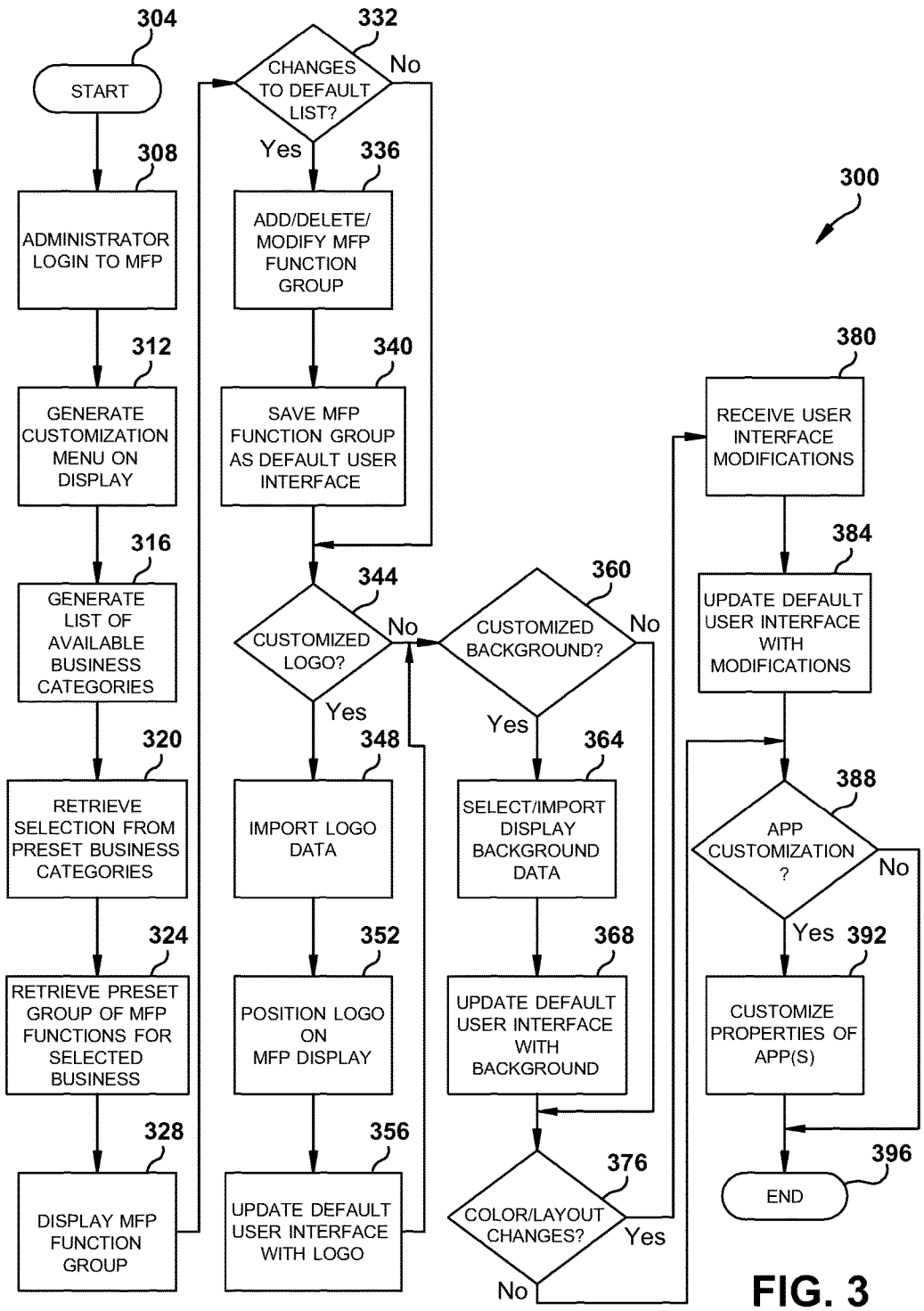
FIG. 3 is a flowchart of an example embodiment for providing a business customizable MFP.

FIG. 3 illustrates a flowchart 300 of an example embodiment for providing a business customizable MFP. The process commences at block 304 and proceeds to block 308 wherein an administrator suitably logs into the MFP, either on the MFP user interface or via a remote terminal. A customization menu is displayed to the administrator at block 312 and a list of available business categories displayed at block 316. The administrator's selection of an available category is received at block 320. Next, a group of preset MFP functions, suitably comprised of applications that can be individually selected or selected in groups, is retrieved from storage at block 324 and displayed to the administrator at block 328. Functions may be retrieved that have been preselected to be associated with a business category or type previously selected by the administrator. If a change is to be made as determined at block 332, then the administrator's changes are made at block 336, saved to the default user interface at block 340, and a check is made at block 344 if a customized logo is to be added for displaying on the MFP user interface. If no changes to the function list are determined at block 332, progress goes directly to the logo change check of block 344.

If the administrator chooses to add a logo at block 344, then logo data is imported into the MFP at block 348 by physical media, wireless connection, wired connection or via a network connection. The administrator positions the logo on a display screen or screens at block 352 and the MFPs default user interface updated accordingly at block 356. A check is then made at block 360 to determine whether a customized background is to be used. Progress to block 360 is direct from block 344 if no customized logo is to be used.

If a customized background is selected at block 360, then it is set at block 364 using either already available options on the MFP or imported background data. The default user interface is updated accordingly at block 368 and then a determination as to whether any changes to the MFP user interface color or layout is made at block 376. Progress is made directly from block 360 to block 376 if no changes to the MFP user interface background are selected.

If color or layout changes are selected in block 376, then the modifications are received at block 380 and the default user interface is stored accordingly at block 384. Next a check as to whether application customization is to be made is completed at block 388. If no color or layout changes were determined at block 376, progress is directly to block 388 for the check for customized applications. If customized applications are to be made, this is accomplished at block 392 and the process ends at block 396. If no application customization is determined at block 388, the process ends thereafter at block 396.

Turning now to FIG. 4, illustrated is an example embodiment of a screenshot 400 for administrative customization of applications. In this example, the administrator can configure application settings, such as scan quality at 404, color mode at 408, output file type at 412, page scanning at 416 and finishing at 420. The administrator may choose whether a scan confirmation is to be sent at 424.

Figure 5:
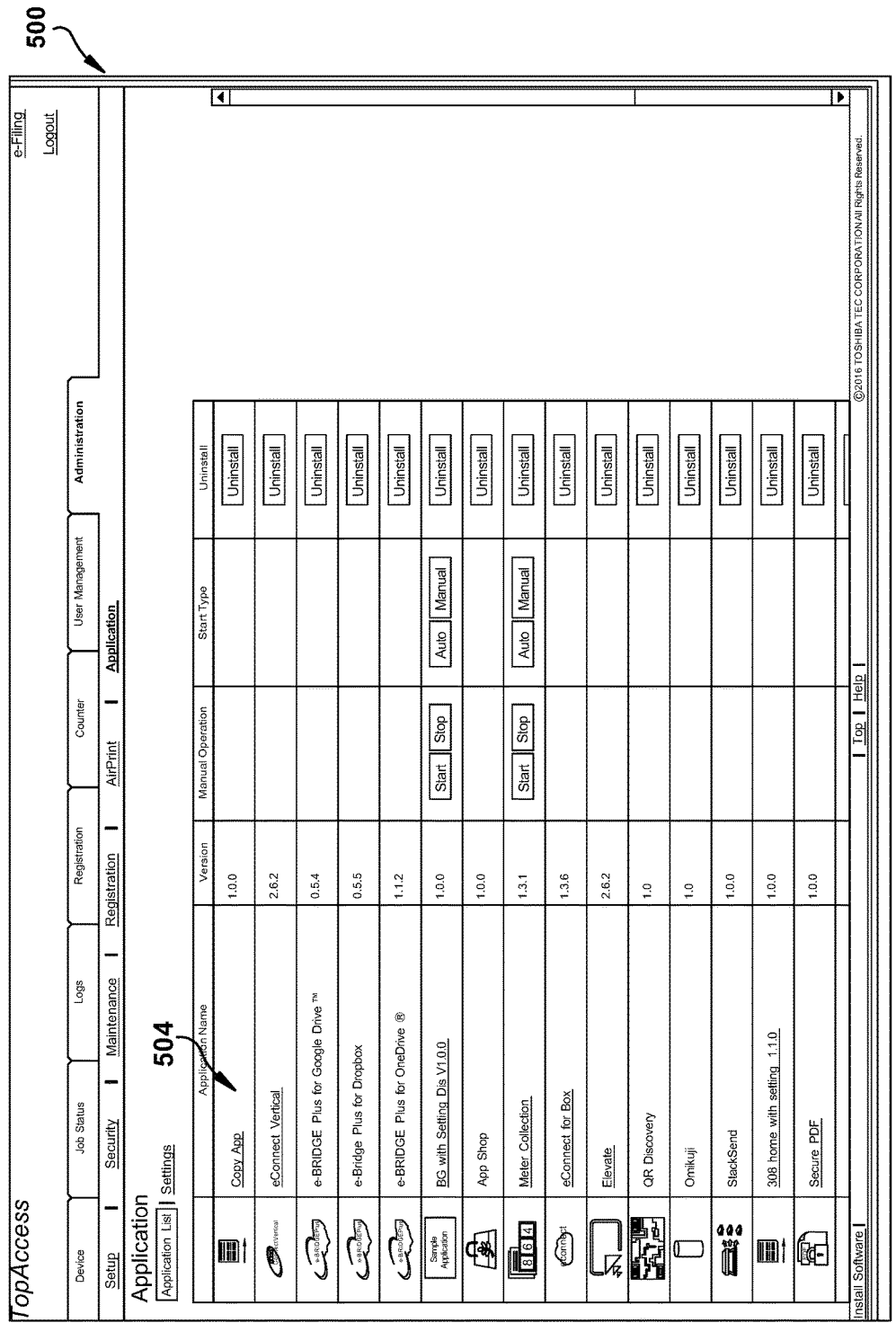
FIG. 5 is an example embodiment of a screenshot for administrative customization of applications.

FIG. 5 illustrates an example embodiment of a screenshot 500 for administrative customization of applications. In the illustrated example, a list of available applications appears at 504, which applications can be installed/uninstalled or modified.

Figure 6:
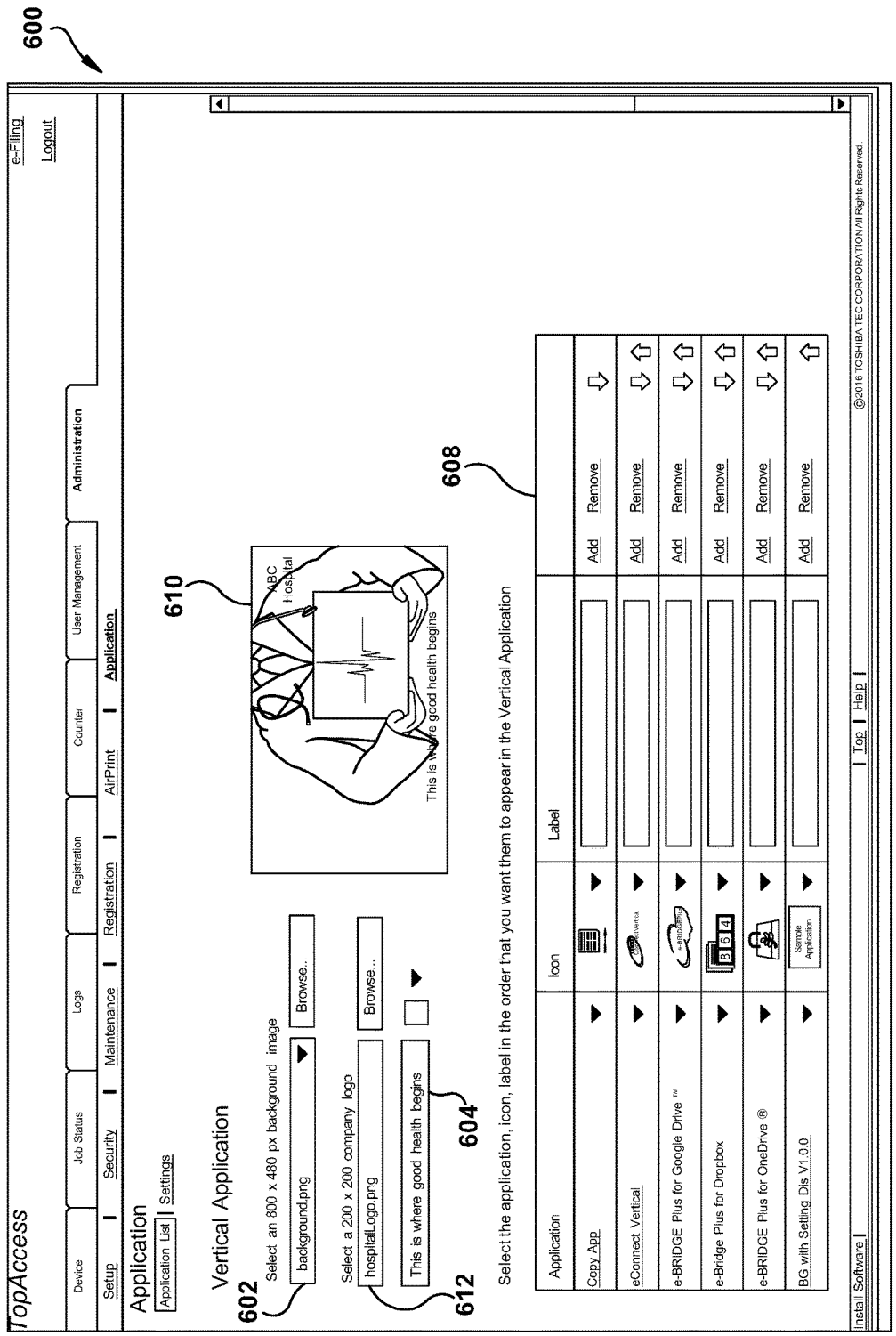
FIG. 6 is an example embodiment of a screenshot for administrative customization.

FIG. 6 illustrates an example embodiment of a screenshot 600 for further administrative customization. The vertical application (or UI Customization) is designed to contain one or many installed apps. Additionally, the UI is configurable by the administrator. Possible customizations include the following. Customizations suitably include selects from a set of pre-stored background images or an uploading background image at 602, add a tag line and select a font color at 604, select among the available (installed) applications and change their order or positions of appearance or add an application tag label at 608, or add a company logo at 612.

Figure 7:
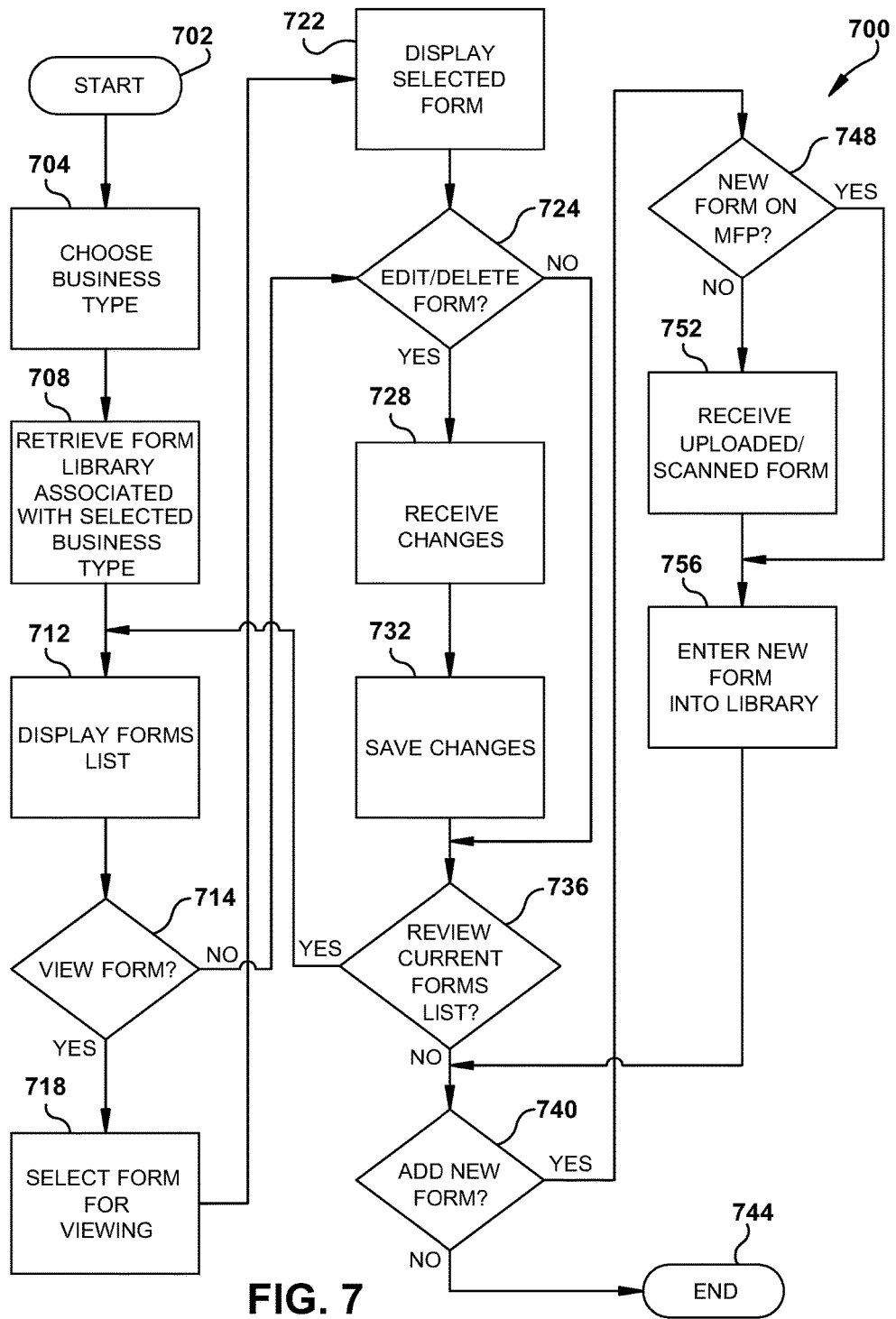
FIG. 7 is a flowchart of an example embodiment of MFP customization relative to available forms.

Referring next to FIG. 7, illustrated is a flowchart 700 of an example embodiment for MFP customization relative to available forms. The process starts at block 702 and proceeds to block 704 wherein a business type is selected from available options by an administrator. A form library associated with a selected business type is retrieved at block 708 and a listing of forms displayed at block 712. The administrator chooses whether to view a form at block 714. If so, the administrator selects a form for viewing at block 718 and display the selected form at block 722. The administrator chooses whether to delete or edit the form at block 724. If no form is selected for viewing at block 714, the process progresses directly to block 724.

If the administrator chooses to edit or delete a form at block 724, changes are received at block 728 and saved at block 732 and the process progresses to block 736. If the administrator did not choose to edit or delete a form at block 724, the process progresses directly to block 736 If the administrator wishes to review the list again at block 736, the process returns to block 712. If not, the administrator chooses whether a new form is desired at block 740. If no new form is needed, the process terminates at block 744. If so, a check is made at block 748 as to whether the new form exists on the MFP, such as a form associated with another business library. If not, the new form is either uploaded digitally or scanned on the MFP scanner at block 752. If the new form is available on the MFP, or if the new form has been uploaded or scanned, the new form is entered into the default library at block 756 and the process returns to block 740 to determine if any other new forms are desired.

When MFP devices are customized for individual business needs, it may be difficult for administrators, such as the third party administrators noted above, to accurately gauge how end users are using a particular device and how they have customized their device for their particular needs. Monitoring can be particularly problematic when end users can alter device functions, such as with selection, ordering or customization of applications. An end user may selected a sequence of available applications, such as scan, then print, then hole punch, then staple, with a user interface button selectable to accomplish this sequence. With a customizable MFP, each function can be selected in order by user selection of the corresponding application. When the conventional third party administrator monitors a customized MFP, the administrator is unaware of any particular applications that may be running on an MFP at a given time. The administrator is also unaware of a particular sequence of applications that have been selected by an end user during MFP customization. There may be device errors that occur due to particular applications being run, by customizations to applications being run or by particular sequences being run. The third party administrator would only know that errors surfaced.

There is no way to troubleshoot errant applications or sequences. Knowledge of applications that are launched, or launched and run, can assist the third party administrator with future devices or device application development. For example, if a large number of end users are customizing their devices with applications in the same or similar manner, it may prompt the third party administrator to roll out new device functions or applications to simplify things for end users in the future. If device errors being reported to the third party administrator are timed with a launch of a particular application, the third party administrator is provided with additional information to address the concern, such as making hardware or software changes for the affected MFP. If a particular feature is not being used, or not being used by a particular business type, the third party administrator can provision a modification to the default settings for that business type, thus making customization easier for future end users.

Figure 8:
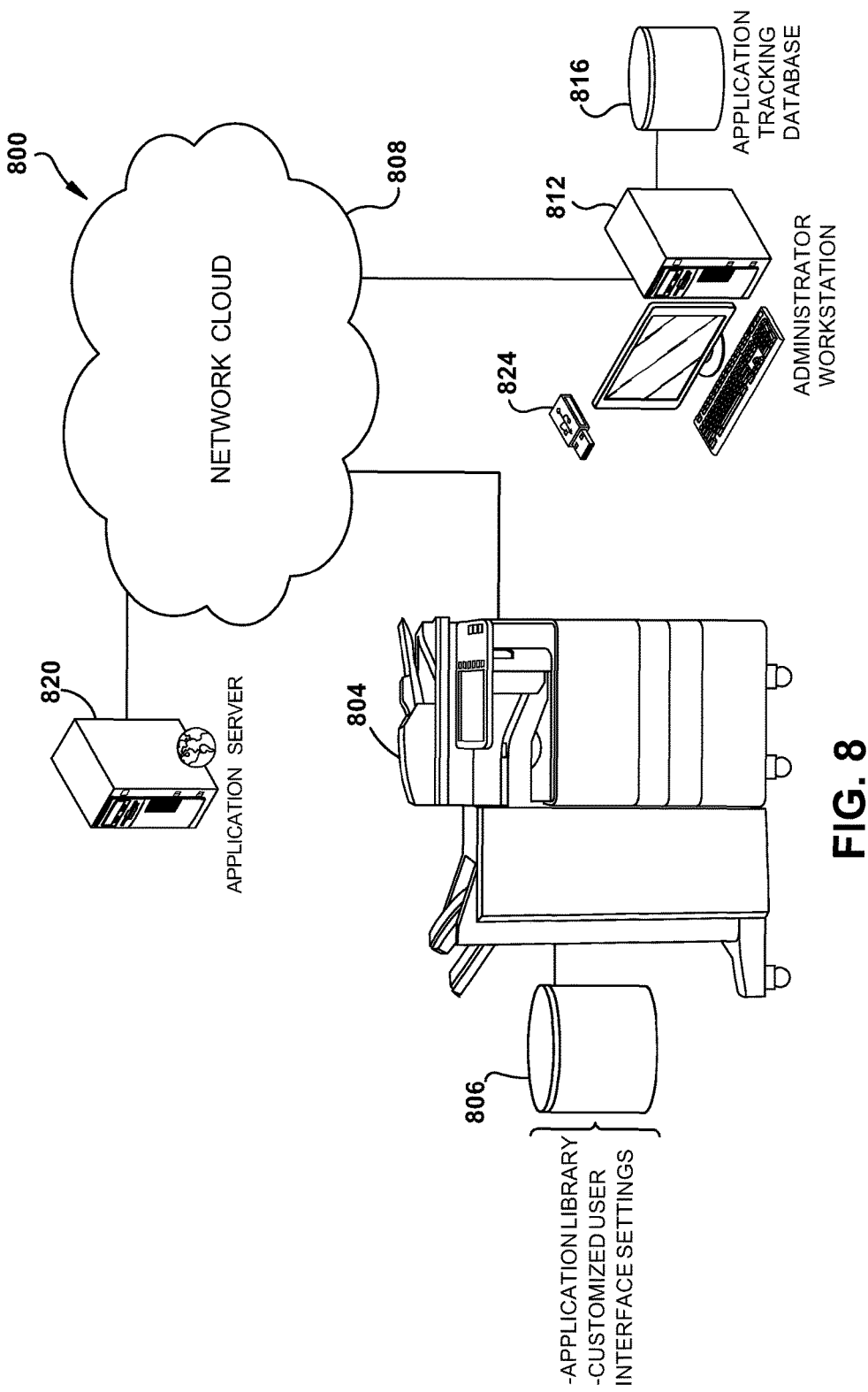
FIG. 8 is an example embodiment of a device network.

Turning next to FIG. 8, illustrated is an example embodiment of a device network 800 that includes one or more MFPs, illustrated by MFP 804. MFP 804 includes a data storage 806 storing information such as available applications and customizations such as those described above. Additional applications may be made available to MFP 804 via a networked application server 820, such as an app store. Applications are also suitably loaded directly into MFP 804 via administrator workstation 812 or via portable media, such as USB flash drive 824, or any other suitable mechanism including CD, DVD, USB file transfer, BLUETOOTH, near field communication (NFC), etc. Network cloud 808 is suitably comprised of a local area network (LAN) or a wide area network (WAN) which may comprise the global Internet, or any suitable combination thereof. A system administrator or other user can monitor a plurality of networked MFPs, such as MFP 804 via administrator workstation 812. While workstation 812 is illustrated as a wired computer, it will be appreciated that any suitable data device, including smartphones, tables, notebook computers, or the like, with network connections that are wireless or wired, may be used. Remote device interfacing is suitably done by accessing an MFP via a network address, such as an IP address. Access may be directly through any suitable network or web interface, and may include tools such as TOPACCESS from Toshiba America Business Solutions, Inc.

Administrator workstation 812 includes data storage 816 that includes data records for each of the plurality of networked MFPs. Included in the data record for each MFP is a device identifier, such as a device serial number; a device error log; and device usage information, such as copy count, toner level, ink level or paper level. In addition, data storage 816 includes information from networked MFPs corresponding to applications that are launched by the corresponding MFP. This information is suitably reported to administrator workstation 812 by each MFP as each application is launched or run, in real time, or near real time, via network cloud 808. MFPs may be preprogrammed to generate report data, or may be discovered by administrator workstation 812 via any suitable network discovery tool, such as SNMP device discovery. MFP 804 may be preprogrammed with network address information for administrator workstation 812, or the workstation 812 can push address information to MFPs after device discovery.

Figure 9:
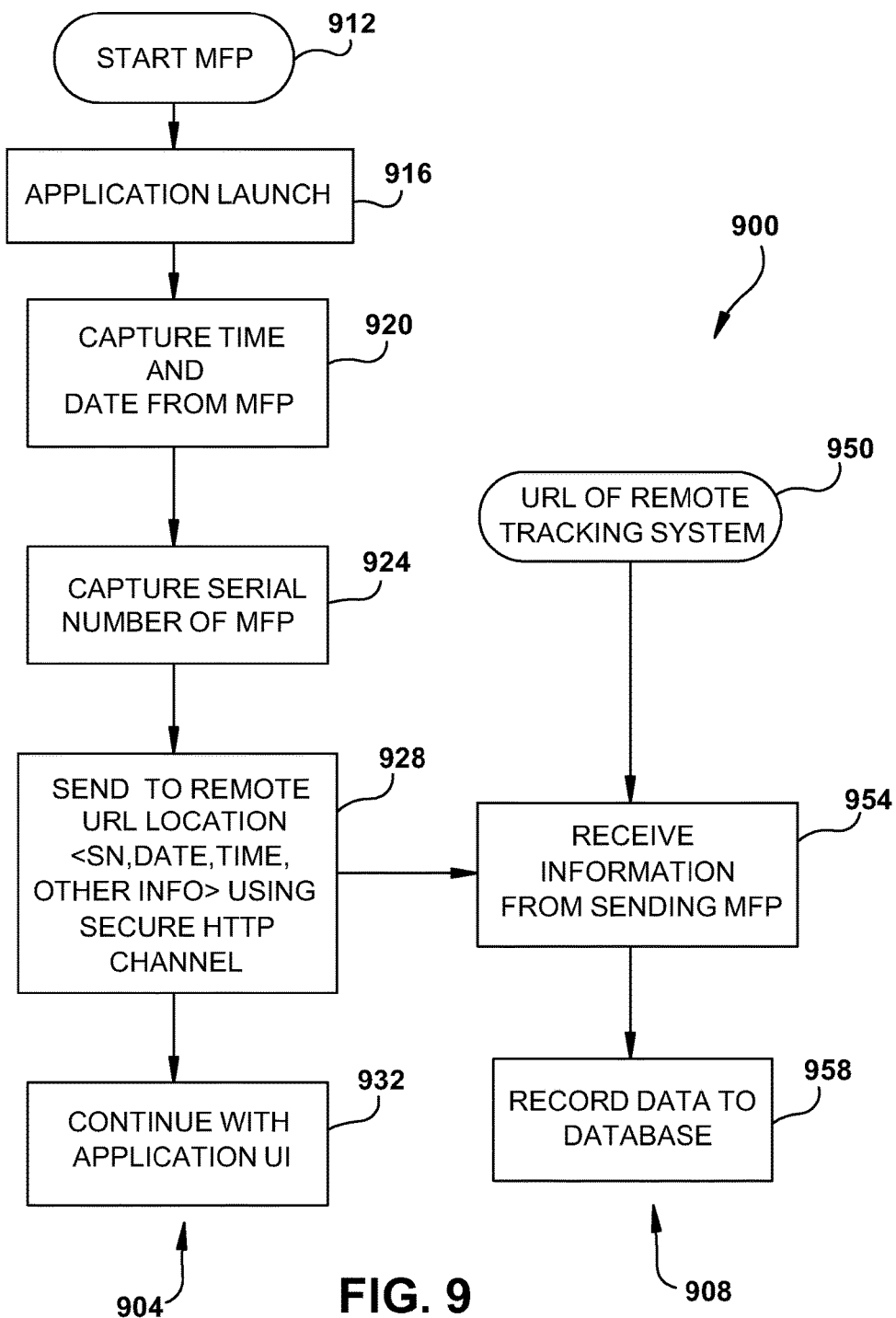
FIG. 9 is an example embodiment of a flowchart for monitoring of application launching or running.

Turning now to FIG. 9, illustrated is a flowchart 900 of an example embodiment for monitoring of application launching or running. Illustrated is operation on MFP side 904 and operation on the administrative computer side 908. On MFP side 904, the process commences at block 912 and proceeds to an application launch at block 916. Time and date of the application launch is obtained, suitably from a time/date module embedded in the MFP, at block 920. A MFP device identifier, such as the device serial number, is pulled from memory at block 924. Next, information as to the application being launched, and temporal information about the application launch, is sent to the administrator workstation at block 928 using a pre-stored network identifier, such as the administrator workstation in a URL or an IP address. The information can be sent using a secure channel, for example using encryption, secure sockets, HTTPS, and so forth as would be understood in the art. The administrator device address information is also suitably pushed from the administrator workstation to the MFP during device discovery, such as detailed above. Other usable device status information, such as that discussed above, is also suitably reported to the administrator workstation contemporaneously, or such information may be reported separately or pulled by the administrator workstation. Next, after application launch the application is run, such as by launching the application's user interface, at block 932.

On administrator computer side 908, the administrator computer's network address, such as IP address, is provided at block 950. Information is received from the MFP at block 954, and information such as application name, application type, launch count, and the like is stored in a database associated with the administrator computer at block 958.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the spirit and scope of the inventions.

What is claimed is:

1. A multifunction peripheral comprising:
   a scanner engine operable for scanning of tangible documents;
   a print engine operable for printing of electronic documents;
   a document processing device controller including a processor configured to control device operations of the multifunction peripheral including operation of the scanner engine and the print engine;
   a network interface; and
   a memory configured to
   store a plurality of user selectable applications for the controller associated with user modification of control of device operations via the controller, store a plurality of identified electronic customization groups, each customization group including a plurality of electronic files, and wherein each customization group corresponds to a unique business type, and store a plurality of device customization data sets, each data set corresponding to document processing in the multifunction peripheral;

wherein the processor is configured to generate indicia on the display identifying each of the plurality of customization groups by business type; and wherein the processor is configured to receive user selection data received via the user input corresponding to a selected identified customization group selected from the indicia, wherein the processor is further configured to generate, on the display, a customizations menu listing available customization from the selected identified customization group, wherein the processor is further configured to generate, on the display, a document processing options menu including document processing options corresponding to a portion of the device customization data sets associated with the selected identified customization group, wherein the processor is further configured to determine when one or more of the user selectable applications is launched, and wherein the processor is further configured to output status data relative to monitored application launches to an associated server via the network interface.

2. The multifunction peripheral of claim 1 wherein the memory is further configured to store identification data corresponding to a unique identifier for the multifunction peripheral and wherein the processor is further configured to capture the status data inclusive of the identification data.

3. The multifunction peripheral of claim 2 wherein the processor is further configured to output the status data inclusive of temporal information relative to the application launches.

4. The multifunction peripheral of claim 3 wherein the multifunction peripheral includes a clock/calendar module and wherein the processor is further configured to capture the status data including time and date information from the clock/calendar module.

5. The multifunction peripheral of claim 4 wherein the unique identifier is comprised of a device serial number for the multifunction peripheral.

6. The multifunction peripheral of claim 5 wherein the network interface is further configured to establish a secure data channel with an associated administrative computer for communication of the status data.

7. The multifunction peripheral of claim 2 wherein the processor is further configured to output status data including device operation data resultant from monitored application launches.

8. A method comprising:
controlling, via a document processing device controller, operation of an associated multifunction peripheral, including operation of a scanner engine and a print engine of the multifunction peripheral, in accordance with at least one user selectable application selected from a library of available applications;

storing, in a memory, a plurality of user selectable applications for the controller associated with user modification of control of document processing device operations via the controller;

storing, in the memory, a plurality of identified electronic customization groups, each customization group including a plurality of electronic customization documents, and wherein each customization group corresponds to a unique business type;

storing, in the memory, a plurality of device customization data sets, each data set corresponding to document processing in the multifunction peripheral;

generating, via a processor, indicia on a display identifying each of the plurality of customization groups by business type;

receiving user selection data corresponding to a selected identified customization group selected from the indicia;

generating, on the display, a customizations menu listing available customizations from the selected identified customization group;

generating, on the display, a document processing options menu including document processing options corresponding to a portion of the device customization data construction sets associated with the selected identified customization group;

receiving user selection data corresponding to commencement of at least one of the document processing options including completing a print operation of a selected one of the available customization on a print engine of the multifunction peripheral;

determining, by the document processing device controller, when one or more of the user selectable applications is launched; and outputting, by the document processing device controller status data relative to monitored application launches to an associated server via the network interface.

9. The method of claim 8 further comprising storing, in the memory, identification data corresponding to a unique identifier for the multifunction peripheral and capturing, by the document processing device controller, the status data inclusive of the identification data.

10. The method of claim 9 further comprising outputting the status data inclusive of temporal information relative to the application launches.

11. The method of claim 10 further comprising capturing the status data including time and date information from a clock/calendar module.

12. The method of claim 11 wherein the unique identifier is comprised of a device serial number for the multifunction peripheral.

13. The method of claim 12 further comprising establishing a secure data channel with an associated administrative computer for communication of the status data.

14. The method of claim 9 further comprising outputting status data including device operation data resultant from monitored application launches.

* * * * *